United States Patent
Yeh et al.

(10) Patent No.: US 9,229,511 B2
(45) Date of Patent: Jan. 5, 2016

(54) REDUNDANT POWER SYSTEM

(71) Applicant: ACBEL POLYTECH INC., New Taipei (TW)

(72) Inventors: Jung-Tai Yeh, New Taipei (TW); Kai-Chen Yang, New Taipei (TW); Cheng-Chen Lin, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 209 days.

(21) Appl. No.: 14/135,998

(22) Filed: Dec. 20, 2013

(65) Prior Publication Data

US 2015/0177805 A1   Jun. 25, 2015

(51) Int. Cl.
*G06F 1/00*   (2006.01)
*G06F 1/26*   (2006.01)

(52) U.S. Cl.
CPC ........................................ *G06F 1/263* (2013.01)

(58) Field of Classification Search
None
See application file for complete search history.

(56) References Cited

U.S. PATENT DOCUMENTS

2012/0303993 A1*   11/2012   Nishtala et al. ............... 713/340

\* cited by examiner

*Primary Examiner* — Kim Huynh
*Assistant Examiner* — Paul J Yen
(74) *Attorney, Agent, or Firm* — Rabin & Berdo, P.C.

(57) ABSTRACT

A redundant power system has a first power supply and a second power supply. The first power supply has a first controller with a first communication port and a first I/O port and has a normal mode, a master mode and a slave mode. An external device can send a mode setting command to the first controller through the first communication port. The first I/O port is set as an input port or an output port according to the mode executed by the first controller, wherein the output port is for indicating a power providing status of one power supply and the input port is for determining a power providing status of the other power supply. The power supplies can provide an appropriate power to a server according to the modes executed by the two controllers.

16 Claims, 4 Drawing Sheets

REDUNDANT POWER SYSTEM

BACKGROUND OF THE INVENTION

1. Field of the Invention

The present invention relates to a power system, and more particularly to a redundant power system.

2. Description of Related Art

Compared with a single power supply, a redundant power system can provide a more stable DC power. The redundant power system mainly comprises a backplane module and multiple power supplies. Each power supply has a rear-stage circuit having a controller for communication with the backplane module. When an electronic product, such as a server, is equipped with the redundant power system, the server can communicate with the power supplies through the backplane module.

A conventional control mode of the redundant power supply is an average-current control mode. In a normal condition, the power supplies of the redundant power system average the working power that the server needs. For example, the redundant power system has dual power supplies. The working power of the server is 1000 (W). Each power supply of the redundant power system provides 500 (W) of power, such that the server totally obtains 1000 (W) from the two power supplies.

However, as operation conditions differ among electronic products, the average-current control mode cannot be applicable for all electronic products. From the manufacturer's perspective, to custom-make redundant power supplies applicable for various electronic products causes high manufacturing cost. To store the numerous conventional redundant power systems also causes trouble in inventory management. The conventional redundant power system needs further improvement.

SUMMARY OF THE INVENTION

An objective of the present invention is to provide a redundant power system applicable for various electronic products.

The redundant power system of the invention is connected to an external device. The redundant power system comprises a first power supply and a second power supply.

The first power supply has a first front-stage power circuit and a first rear-stage power circuit. The first rear-stage power circuit has a first controller to be operated in a normal mode, a master mode or a slave mode. The first controller obtains an output voltage and an output current from a power output terminal of the first power supply and has a first communication and a first I/O port. The first communication port receives a mode setting command from the external device.

The second power supply has a second front-stage power circuit and a second rear-stage power circuit. The second rear-stage power circuit has a second controller having second communication port and a second I/O port. The second I/O port is connected to the first I/O port.

When the first controller determines that the first power supply normally provides power based on the output voltage and the output current of the first power supply, the first controller selects one of the modes and executes the selected mode according to the mode setting command from the first communication port and a voltage level of the second I/O port of the second controller.

When the mode setting command is a normal mode setting command, the first controller executes the normal mode to set a low voltage level on the first I/O port, and to control the first power supply to provide an average power.

When the mode setting command is a master mode setting command, the first controller executes the master mode to determine whether a present loading power is higher than an heavy loading power or lower than a light loading power. When the present loading power is higher than the heavy loading power, the first controller sets a low voltage level on the first I/O port, and controls the first power supply to provide the average power. When the present loading power is lower than the light loading power, the first controller sets the high voltage level on the first I/O port, and controls the first power supply to provide a full power.

When the mode setting command is a slave mode setting command, the first controller executes the slave mode to set the first I/O port as an input port for detecting the voltage level of the second I/O port of the second power supply. When the voltage level of the second I/O port is low, the first controller controls the first power supply to provide the average power or the full power. When the voltage level of the second I/O port is high, the first controller controls the first power supply to stop providing power.

In conclusion, the first controller of the invention is preset with multiple modes. The first controller sets the first I/O port as an output port for indicating a power providing status of the first power supply, or sets the first I/O port as an input port for determining a power providing status of the second power supply. Hence, the first power supply and the second power supply can provide an appropriate power to any electronic product according to the modes executed by the two controllers.

DETAILED DESCRIPTION OF THE PREFERRED EMBODIMENT

Figure 1:
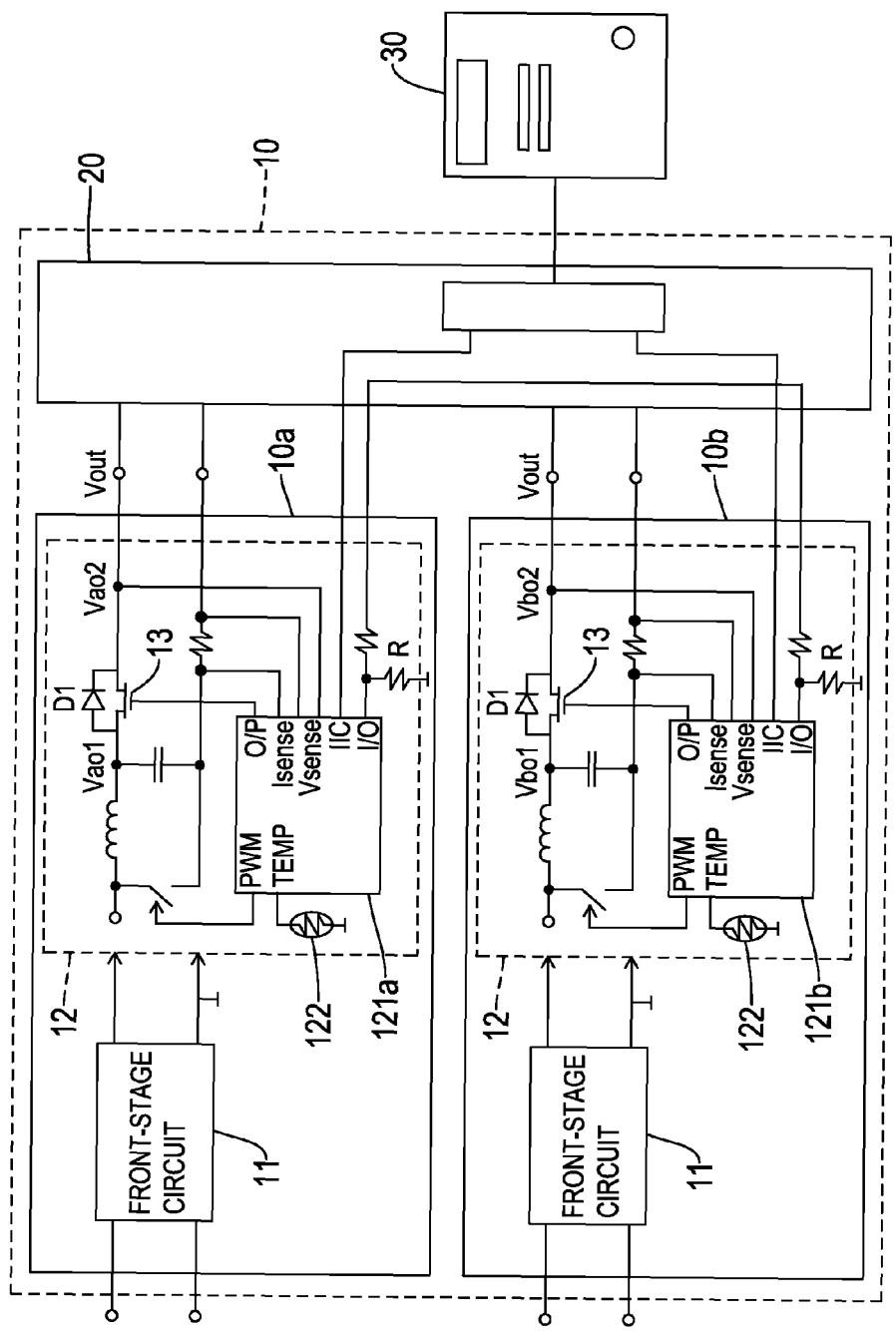
FIG. 1 is a circuit block diagram of an embodiment of a redundant power system of the invention.

With reference to FIG. 1, a first embodiment of a redundant power system 10 of the invention is disclosed. The redundant power system comprises a first power supply 10a and a second power supply 10b, or further comprises a backplane module 20. The power supplies 10a, 10b are connected to the backplane module 20. The backplane module 20 is connected to a server 30. The server 30 can provide commands to the power supplies 10a, 10b.

The first power supply 10a is a switching power supply comprising a first front-stage circuit 11a, a first rear-stage circuit 12a, a first electric switch 13a and a power output terminal (Vout). The second power supply 10a is a switching power supply comprising a second front-stage circuit 11b, a second rear-stage circuit 12b, a second electric switch 13b and a power output terminal (Vout). The electric switches 13a, 13b of the power supplies 10a, 10b are respectively connected to the power output terminals (Vout) of the power supplies 10a, 10b in series. The rear-stage circuits 12a, 12b of the power supplies 10a 10b respectively have a first controller 121a and a second controller 121b. The first controller 121a is connected to the first electric switch 13a of the first rear-stage circuit 12a of the first power supply 10a. The second controller 121b is connected to the second rear-stage circuit 12b of the second power supply 10b. The controllers 121a, 121b respectively turn on or turn off the electric switches 13a, 13b of the rear-stage circuits 12a, 12b of the power supplies 10a, 10b. The controllers 121a, 121b also respectively detect loading powers of the power supplies 10a, 10b according to output voltages and output currents detected from the output terminals (Vout) of the power supplies 10a, 10b. The controllers 121a, 121b control the electric switches 13a, 13b to respectively adjust loading powers provided from the power supplies 10a, 10b.

The first controller 121a has a first communication port (IIC) and a first I/O (input and output) port (I/O). The second controller 121b has a second communication port (IIC) and a second I/O port (I/O). The communication ports (IIC) of the controllers 121a, 121b can receive mode setting commands from the server 30. In this embodiment, the communication ports (IIC) of the controllers 121a, 121b can be I-squared-C ports. The communication ports (IIC) of the controllers 121a, 121b are connected to the server 30 via the backplane module 20 to receive the mode setting commands from the server 30. The I/O ports (I/O) of the controllers 121a, 121b are each connected to a respective grounded resistor (R). The first I/O port (I/O) of the first controller 121a is connected to the second I/O port (I/O) of the second controller 121b.

The protocol format of the mode setting commands is disclosed in the following table.

| Command code | TBD |
|---|---|
| Command title | PSU Mode |
| Read/write | R/W |
| Data bit | 1 |
| Remarks | 0x00: Normal Mode |
| | 0x01: CR Main (Master) Mode |
| | 0x02: CR Standby (Slave) Mode |

The controllers 121a, 121b each respectively have a normal mode, a master mode and a slave mode to be operated in any one of the modes, wherein the normal mode, the master mode and the slave mode are built-in modes in the controllers 121a. 121b. For example, when the first controller 121a determines that the first power supply 10a normally provides power based on the output voltage and the output current of the first power supply 10a, the first controller 121a selects one of the normal mode, the master mode and the slave mode according to the mode setting command received from the first communication port (IIC) and a voltage level of the second I/O port (I/O) of the second controller 121b. The first controller 121a then executes the selected mode.

For example, when the mode setting command is a normal mode setting command, the first controller 121a executes the normal mode to set a low voltage level on the first I/O port (I/O), and to control the first power supply 10a to provide an average power.

When the mode setting command is a master mode setting command, the first controller 121a executes the master mode to determine whether a present loading power is higher than a heavy loading power or lower than a light loading power. When the present loading power is higher than the heavy loading power, the first controller 121a sets a low voltage level on the first I/O port (I/O), and controls the first power supply 10a to provide the average power. When the present loading power is lower than the light loading power, the first controller 121 a sets the high voltage level on the first I/O port (I/O), and controls the first power supply 10a to provide a full power. At that time, the power consumed by the server 30 is light. The power supplies 10a, 10b do not provide average powers to the server 30 at a same time. In other words, the power of the server 30 is totally provided by the first power supply 10a to improve the efficiency.

When the mode setting command is a slave mode setting command, the first controller 121a executes the slave mode to set the first I/O port (I/O) as an input port for detecting the voltage level of the second I/O port (I/O) of the second controller 121b. When the voltage level of the second I/O port (I/O) is low, the first controller 121a controls the first power supply 10a to provide the average power or the full power. When the voltage level of the second I/O port (I/O) is high, the first controller 121a controls the first power supply 10a to stop providing power.

In conclusion, the controllers 121a, 121b respectively have multiple built-in modes. As mentioned above, the first controller 121a sets the first I/O port (I/O) as the output port for indicating the power providing status of the first power supply 10a, or sets the first I/O port (I/O) as the input port for determining the power providing status of the second power supply 10b. The combinations of the modes of the two power supplies are disclosed in the following table. The power supplies 10a, 10b thus can satisfy the demands of different servers.

| First controller | Second controller | Statement |
|---|---|---|
| Normal mode | Normal mode | The power supplies respectively provide the average power (50%). |
| Normal mode | Master mode | The power supplies respectively provide the average power (50%). |
| Normal mode | Slave mode | The power supplies respectively provide the average power (50%). |
| Master mode | Normal mode | The power supplies respectively provide the average power (50%). |
| Master mode | Master mode | The power supplies respectively provide the average power (50%). |
| Master mode | Slave mode | The first power supply provides the full power (100%), and the second power supply stops providing power. |
| Slave mode | Normal mode | The power supplies respectively provide the average power (50%). |
| Slave mode | Master mode | The first power supply stops providing power, and the second power supply provides the full power (100%). |
| Slave mode | Slave mode | The power supplies respectively provide the average power (50%). |

With reference to FIG. 2, a preferred process executed by the controllers 121a, 121b is disclosed.

First of all, when the first controller 121a is activated, the first controller 121a executes the normal mode as a default mode, sets the first I/O port (I/O) as an output port, and sets a low voltage level on the first I/O port (I/O) (Step 11).

Afterwards, the first controller 121a determines whether the mode setting command received from the first communication port (IIC) is the master mode setting command (Step 12).

When the mode setting command is the master mode setting command, the first controller 121a sets the first I/O port (I/O) as an output port, sets the low voltage level on the first I/O port (I/O), and turns to execute the master mode (Step 13). Afterwards, the first controller 121a checks whether the mode setting command is the master mode setting command again (Step 16).

Figure 2A:
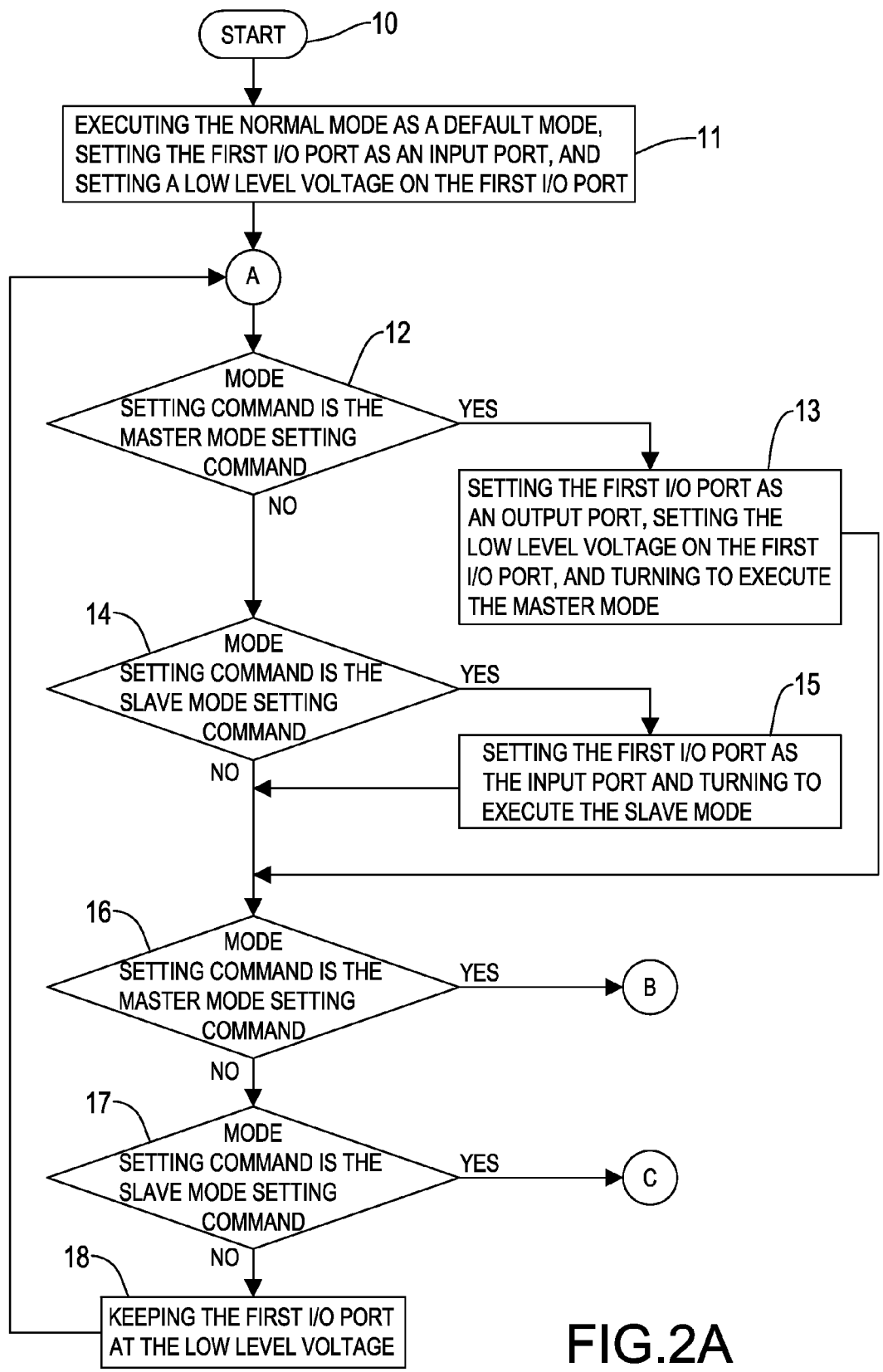
FIGS. 2A-2C are flow charts executed by the controllers of the redundant power system of the invention.
Figure 2B:
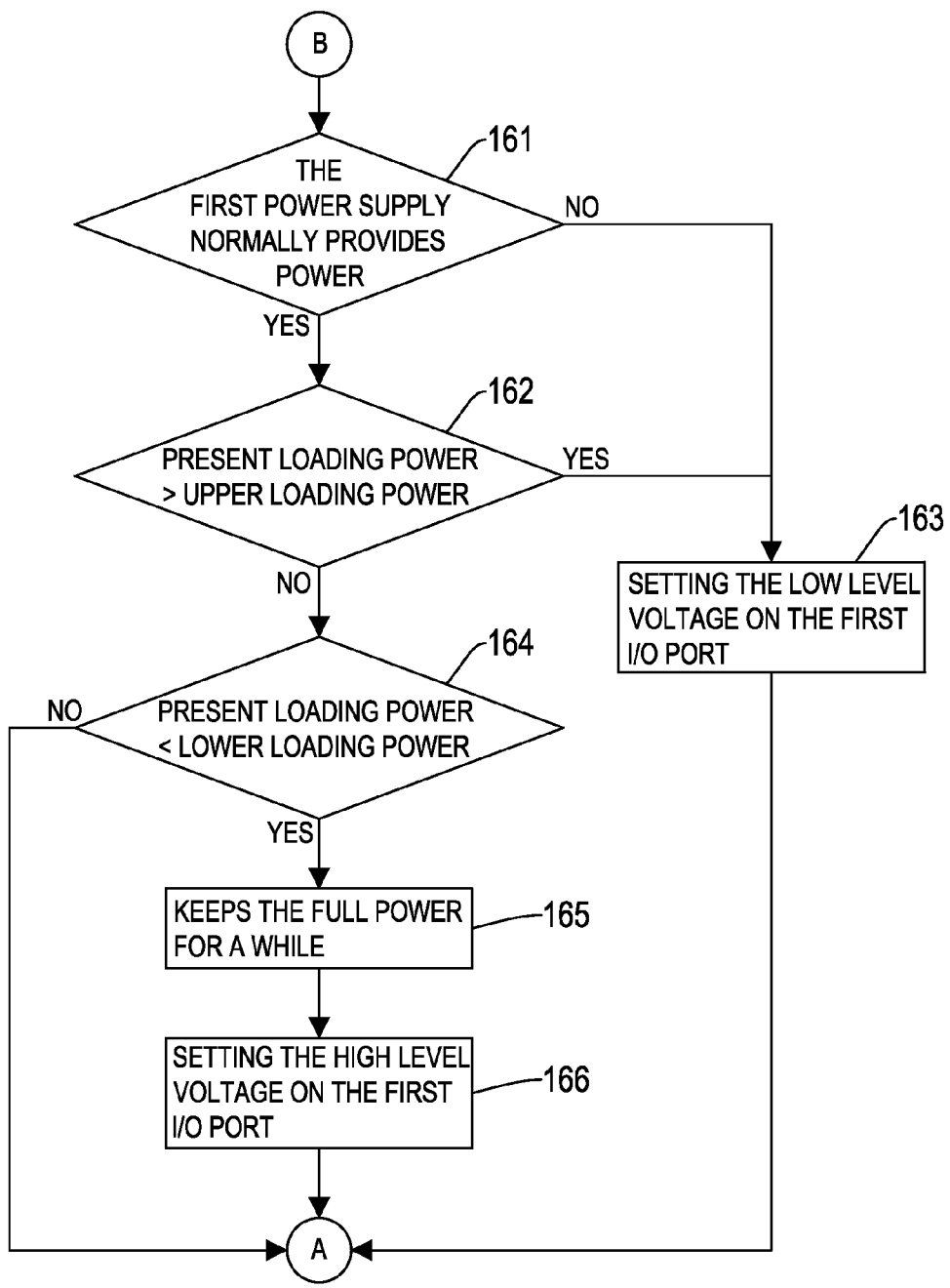

In Step 16, when the mode setting command is still the master mode setting command, with reference to FIG. 2B, the first controller 121a determines whether the first power supply 10a normally provides power (Step 161). When the first power supply 10a normally provides the power, the first controller 121a determines whether a present loading power of the server 30 is higher than an heavy loading power (step 162), wherein the heavy loading power can be 70% of the full power. When the present loading power is higher than the heavy loading power, the first controller 121a activates the first electric switch 13a to control the first power supply 10a to provide the average power, and keeps the first I/O port (I/O) at the low voltage level (Step 163). Meanwhile, the second controller 121b, presently operated in the slave mode, detects that the voltage level of the first I/O port (I/O) is low. Therefore, the second controller 121b correspondingly activates the second electric switch 13b of the second power supply 10b to control the second power supply 10b to provide the average power, such that the first power supply 10a and the second power supply 10b average the present loading power consumed by the server 30.

In Step 162, when the present loading power is lower than the heavy loading power, the first controller 121a determines whether the present loading power of the server 30 is lower than a light loading power (Step 164). The light loading power means that a system loading power is lower than 40% or the power provided from the first power supply 10a is lower than 20%. When the present loading power is lower than the light loading power, the first controller 121a provides the full power and keeps the full power for a while (about 100 ms) (Step 165). Afterwards, the first controller 121a sets the first I/O port (I/O) as the output port and sets the high voltage level on the first I/O port (I/O) (Step 166).

Figure 2C:
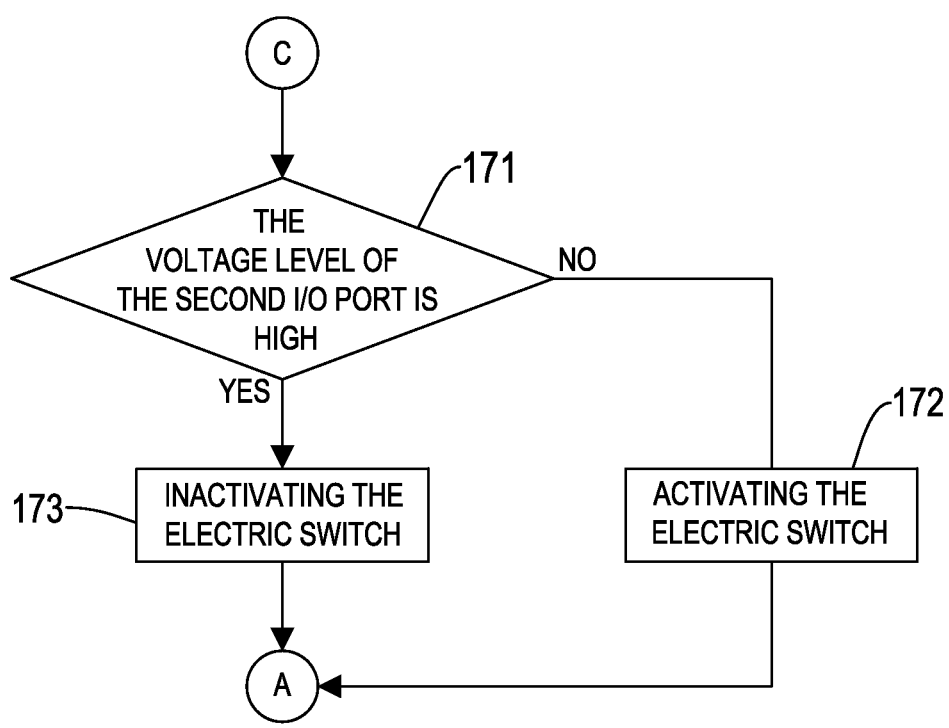

With reference to FIG. 2A, when the first controller 121a is activated and determines the mode setting command is the slave mode setting command (Step 14), the first controller 121a sets the first I/O port (I/O) as the input port and executes the slave mode (Step 15). Afterward, the first controller 121a checks that the mode setting command is the slave mode setting command again (Step 17). With reference to FIG. 2C, when the mode setting command is still the slave mode setting command, the first controller 121a determines whether the voltage level of the second I/O port (I/O) is high (Step 171). When the voltage level of the second I/O port (I/O) is high, the first controller 121a inactivates the first electric switch 13a to control the first power supply 10a to stop providing the power (Step 173). When the first controller 121a determines the voltage level of the second I/O port (I/O) is low, the first controller 121a activates the first electric switch 13a to control the first power supply 10a to provide the full power or the average power (Step 172). In other words, when the first controller 121a detects the voltage level of the second I/O port (I/O) of the second controller 121b is low, the first power supply 10a needs to provide the power. The first power supply 10a needs to provide the power under the following two conditions:

1. The second power supply 10b is unavailable for providing power;
2. The second power supply 10b is operated in the master mode and the power consumed by the server is heavy.

Based on the mode combinations of the two power supplies 10a, 10b, when a user wants the redundant power system to provide equal power, the user can set the normal mode to the power supplies 10a, 10b. Hence, the two power supplies 10a, 10b respectively provide the average power (50% of a full power). For the server that variably consumes power, the user can set one of the power supply 10a to execute the master mode, and set the other power supply 10b to execute the slave mode.

When the first power supply 10a executing the master mode determines that the power consumed by the server 30 is heavy, the first controller 121a controls the first power supply 10a to provide the average power, sets the first I/O port (I/O) as an output port, and sets a low voltage level on the first I/O port (I/O). The second power supply 10b executing the slave mode thus detects the low voltage level of the first I/O port (I/O). The second controller 121b then provides the average power, such that the first power supply 10a and the second power supply 10b both average the power consumed by the server 30. When the power consumed by the server 30 is low, the first power supply 10a executing the master mode determines the server 30 presently consumes a low power. The first controller 121a then sets the first I/O port (I/O) as an output port and sets a high voltage level on the first I/O port (I/O). As a result, the second power supply 10b executing the slave mode detects the high voltage level of the first I/O port (I/O). The second controller 10b controls the second power supply 10b to stop providing the power.

When the user incorrectly sets the slave mode to both of the power supplies 10a, 10b, the controllers 121a, 121b respectively detect the low voltage level on their I/O ports (I/O) due to the grounded resistors (R). Even if the user incorrectly sets the slave mode to both of the power supplies 10a, 10b, the power supplies 10a, 10b still respectively provide the average power.

In addition, each controller 121a, 121b further determines whether an over-voltage status or an over-current status occurs according to the present output voltage and the output current detected from the power output terminals (Vout) of the power supplies 10a, 10b. The controllers 121a, 121b can each be further connected to a respective temperature sensor 122, such that the controllers 121a, 121b are capable of determining whether the power supplies 10a, 10b are overheated. When the controllers 121a, 121b detect any one of the statuses mentioned above, the controllers 121a, 121b set the low voltage level on their I/O ports (I/O). When the controller 121a detects the over-voltage status, the first controller 121a sets the low voltage level on the first I/O port (I/O). Thus, the second controller 121b executing the normal mode detects the low voltage level of the first I/O port (I/O). The second controller 121b controls the second power supply 10b to provide the full power instead of providing the average power to assure that the server 30 can correctly work.

The controllers 121a, 121b can respectively have a current following mode. The current following mode can be built-in modes of the controllers 121a, 121b. For example, when the first power supply 10a executes the current following mode, the first controller 121a sets the first I/O port (I/O) as an input port for detecting the voltage level of the second I/O port (I/O). When the voltage level of the first I/O port (I/O) of the first controller 121a is high, the first controller 121a adjusts an output voltage (Vao1) of the first rear-stage circuit 12a of the first power supply 10a according to a current following command received from the first communication port (IIC) until the output current is equal to a current defined by the current following command. Hence, a user can set the power provided by the power supplies 10a, 10b. For example, the server 30 needs to consume 1000 W of power. The user can set the second power supply 10b to provide 700 W of power, such that the first power supply 10a can only provide 300 W of power. The first power supply 10a then adjusts the output voltage (Vao1) of the first rear-stage circuit 12a according to a demand current of 300 W. When, for some incident, the second power supply 10b cannot provide the power, the second controller 121b sets the low voltage level on the second I/O port (I/O). The first controller 121a thus detects the low voltage level of the second I/O port (I/O) and then controls the first power supply 10a to provide the full power, such that the server 30 can correctly work by receiving the power from the first power supply 10a.

The power supplies 10a, 10b can stop providing the loading powers by inactivating the electric switches 13a, 13b. The electric switches 13a, 13b are connected to the power output terminals (Vout) in series. When the electric switches 13a, 13b are inactivated by the controllers 121a, 121b, the server 30 cannot get power from the power supplies 10a 10b. The electric switches 13a, 13b can be power transistors. When the power transistor is turned off, a parasitic diode of the power transistor is turned conductive. The power output terminal (Vout) still maintains a voltage obtained by subtracting the voltage of the parasitic diode from the output voltage (Vao1). Hence, the output voltage (Vao2) of the first power supply 10a is lower than the output voltage (Vbo2) of the second power supply 10b. The server 30 obtains the output current from the power supply that outputs higher output voltage. The first power supply 10a thus stops providing power.

In conclusion, the controllers of the invention are respectively preset with multiple modes. The controller sets the I/O port as an output port for indicating a power providing status of the power supply, or sets the I/O port as an input port for determining a power providing status of the other power supply. Hence, the first power supply and the second power supply can provide an appropriate power to a server according to the modes executed by the two controllers.

What is claimed is:

1. A redundant power system connected to an external device, the redundant power system comprising a first power supply and a second power supply;
    the first power supply having a first front-stage power circuit and a first rear-stage power circuit, the first rear-stage power circuit having a first controller to be operated in a normal mode, a master mode or a slave mode, the first controller obtaining an output voltage and an output current from a power output terminal of the first power supply and having:
        a first communication port for receiving a mode setting command from the external device; and
        a first I/O (input and output) port; and
    the second power supply having a second front-stage power circuit and a second rear-stage power circuit, the second rear-stage power circuit having a second controller, the second controller having
        a second communication port; and
        a second I/O port connected to the first I/O port;
    wherein when the first controller determines that the first power supply normally provides power based on the output voltage and the output current of the first power supply, the first controller selects one of the modes and executes the selected mode according to the mode setting command from the first communication port and a voltage level of the second I/O port of the second controller;
    when the mode setting command is a normal mode setting command, the first controller executes the normal mode to set a low voltage level on the first I/O port, and to control the first power supply to provide an average power;
    when the mode setting command is a master mode setting command, the first controller executes the master mode to determine whether a present loading power is higher than an heavy loading power or lower than a light loading power; when the present loading power is higher than the heavy loading power, the first controller sets a low voltage level on the first I/O port, and controls the first power supply to provide the average power; when the present loading power is lower than the light loading power, the first controller sets the high voltage level on the first I/O port, and controls the first power supply to provide a full power; and when the mode setting command is a slave mode setting command, the first controller executes the slave mode to set the first I/O port as an input port for detecting the voltage level of the second I/O port of the second power supply; when the voltage level of the second I/O port is low, the first controller controls the first power supply to provide the average power or the full power; when the voltage level of the second I/O port is high, the first controller controls the first power supply to stop providing power.

2. The redundant power system as claimed in claim 1, wherein the first controller has a built-in mode of current following mode; when the first controller executes the current following mode, the first controller sets the first I/O port as the input port for detecting the voltage level of the second I/O port of the second controller; when the voltage level of the second I/O port is high, the first controller adjusts the output voltage of the first power supply according to a current following command received from the first communication port until the output current of the first power supply is equal to or higher than a current defined by the current following command.

3. The redundant power system as claimed in claim 1, wherein the first I/O port and the second I/O port are each connected to a respective grounded resistor.

4. The redundant power system as claimed in claim 2, wherein the first I/O port and the second I/O port are each connected to a respective grounded resistor.

5. The redundant power system as claimed in claim 3, wherein the first controller determines whether an over-voltage status or an over-current status occurs according to the output voltage and the output current of the first power supply; when the over-voltage status or the over-current status occurs, the first controller sets the low voltage level on the first I/O port.

6. The redundant power system as claimed in claim 4, wherein the first controller determines whether an over-voltage status or the over-current status occurs according to the output voltage and the output current of the first power supply; when the over-voltage status or the over-current status occurs, the first controller sets the low voltage level on the first I/O port.

7. The redundant power system as claimed in claim 5, wherein
    the first controller is connected to a first temperature sensor for detecting a temperature of the first power supply; when the first power supply is overheated, the first controller sets the low voltage level on the first I/O port; and
    the second controller is connected to a second temperature sensor for detecting a temperature of the second power supply; when the second power supply is overheated, the second controller sets the low voltage level on the second I/O port.

8. The redundant power system as claimed in claim 6, wherein
    the first controller is connected to a first temperature sensor for detecting a temperature of the first power supply; when the first power supply is overheated, the first controller sets the low voltage level on the first I/O port; and
    the second controller is connected to a second temperature sensor for detecting a temperature of the second power supply; when the second power supply is overheated, the second controller sets the low voltage level on the second I/O port.

9. The redundant power system as claimed in claim 1, wherein the power output terminal of the first power supply is connected to an first electric switch in series; and the first controller is connected to the first electric switch; when the first controller turns off the first electric switch, the first power supply stops providing power.

10. The redundant power system as claimed in claim 2, wherein the power output terminal of the first power supply is connected to an first electric switch in series; and the first controller is connected to the first electric switch; when the first controller turns off the first electric switch, the first power supply stops providing power.

11. The redundant power system as claimed in claim 5, wherein the power output terminal of the first power supply is connected to an first electric switch in series;

the first controller is connected to the first electric switch; when the first controller turns off the first electric switch, the first power supply stops providing power.

12. The redundant power system as claimed in claim 6, wherein the power output terminal of the first power supply is connected to an first electric switch in series;

the first controller is connected to the first electric switch; when the first controller turns off the first electric switch, the first power supply stops providing power.

13. The redundant power system as claimed in claim 11, wherein when the first controller is activated, the first controller executes the normal mode as a default mode and sets the low voltage level on the first I/O port;

when the mode setting command is the master mode setting command, the first controller sets the first I/O port as an output port, sets the low voltage level on the first I/O port and turns to execute the master mode; and when the mode setting command is the slave mode setting command, the first controller sets the first I/O port as the input port for detecting the voltage level of the second I/O port, and turns to execute the slave mode.

14. The redundant power system as claimed in claim 12, wherein when the first controller is activated, the first controller executes the normal mode as a default mode and sets the low voltage level on the first I/O port;

when the mode setting command is the master mode setting command, the first controller sets the first I/O port as an output port, sets the low voltage level on the first I/O port and turns to execute the master mode; and when the mode setting command is the slave mode setting command, the first controller sets the first I/O port as the input port for detecting the voltage level of the second I/O port, and turns to execute the slave mode.

15. The redundant power system as claimed in claim 13, wherein when the first controller determines that the first power supply is unavailable for providing power, the first controller sets the first I/O port as an output port and sets the low voltage level on the first I/O port.

16. The redundant power system as claimed in claim 14, wherein when the first controller determines that the first power supply is unavailable for providing power, the first controller sets the first I/O port as an output port and sets the low voltage level on the first I/O port.

* * * * *